(12) United States Patent
Hong et al.

(10) Patent No.: US 11,046,206 B2
(45) Date of Patent: Jun. 29, 2021

(54) BATTERY MODULE WITH SHORT-CIRCUIT UNIT, AND BATTERY PACK AND VEHICLE INCLUDING THE SAME

(71) Applicant: LG CHEM, LTD., Seoul (KR)

(72) Inventors: Soon-Chang Hong, Daejeon (KR); Hyo-Chan Kim, Daejeon (KR); Kye-Yeon Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 246 days.

(21) Appl. No.: 16/332,836

(22) PCT Filed: Jul. 4, 2018

(86) PCT No.: PCT/KR2018/007594
§ 371 (c)(1),
(2) Date: Mar. 13, 2019

(87) PCT Pub. No.: WO2019/009625
PCT Pub. Date: Jan. 10, 2019

(65) Prior Publication Data
US 2019/0366875 A1    Dec. 5, 2019

(30) Foreign Application Priority Data

Jul. 6, 2017 (KR) .................. 10-2017-0085993

(51) Int. Cl.
*B60L 58/15* (2019.01)
*H01M 2/34* (2006.01)
(Continued)

(52) U.S. Cl.
CPC ................ *B60L 58/15* (2019.02); *B60K 6/28* (2013.01); *B60L 50/64* (2019.02); *B60L 58/18* (2019.02);
(Continued)

(58) Field of Classification Search
CPC ............ H01M 50/572; H01M 50/578; H01M 2200/20; H01M 50/581
See application file for complete search history.

(56) References Cited

U.S. PATENT DOCUMENTS 5,800,937 A    9/1998   Decker et al.
6,187,472 B1   2/2001   Shiota et al.
(Continued)

FOREIGN PATENT DOCUMENTS

CN    105518902 A    4/2016
EP    2 284 929 A1   2/2011
(Continued)

OTHER PUBLICATIONS

International Search Report (PCT/ISA/210) issued in PCT/KR2018/007594, dated Oct. 23, 2018.
(Continued)

*Primary Examiner* — Imran Akram
(74) *Attorney, Agent, or Firm* — Birch, Stewart, Kolasch & Birch, LLP

(57) ABSTRACT

A battery module, including a cell stack having a first battery cell and a second battery cell; a first bus bar connected to the cell stack and having a first polarity; a second bus bar connected to the cell stack and having a second polarity opposite to the first polarity; a short-circuit unit that moves toward the first bus bar and the second bus bar in response to receiving an expanding force caused by a volume increase of the first battery cell and the second battery cell, so that the first bus bar and the second bus bar are electrically connected to generate a short circuit; and a cartridge that at least partially accommodates each of the first bus bar, the second bus bar and the short-circuit unit.

7 Claims, 6 Drawing Sheets

(51) Int. Cl.
  *H01M 2/10* (2006.01)
  *H01M 2/20* (2006.01)
  *H01M 2/30* (2006.01)
  *B60L 50/64* (2019.01)
  *B60K 6/28* (2007.10)
  *B60L 58/18* (2019.01)
  *H01M 50/20* (2021.01)
  *H01M 50/502* (2021.01)
  *H01M 50/543* (2021.01)
  *H01M 50/578* (2021.01)

(52) U.S. Cl.
  CPC ......... *H01M 50/20* (2021.01); *H01M 50/502* (2021.01); *H01M 50/543* (2021.01); *H01M 50/578* (2021.01); *B60Y 2200/91* (2013.01); *B60Y 2200/92* (2013.01); *B60Y 2300/92* (2013.01); *H01M 2200/20* (2013.01); *H01M 2220/20* (2013.01)

(56) References Cited

U.S. PATENT DOCUMENTS

| | | | |
|---|---|---|---|
| 2006/0012334 A1* | 1/2006 | Watson | H01M 50/572 320/112 |
| 2006/0093896 A1* | 5/2006 | Hong | H01M 10/425 429/61 |
| 2008/0036561 A1* | 2/2008 | Hartinger | H01H 1/0015 335/156 |
| 2010/0227205 A1 | 9/2010 | Byun et al. | |
| 2011/0037430 A1* | 2/2011 | Jang | H02J 7/0029 320/109 |
| 2011/0039147 A1* | 2/2011 | Cheon | H01M 50/572 429/159 |
| 2011/0189515 A1* | 8/2011 | Yoon | H01M 10/0413 429/61 |
| 2013/0075242 A1 | 3/2013 | Lim | |
| 2013/0230759 A1 | 9/2013 | Jeong et al. | |
| 2013/0323549 A1 | 12/2013 | Choi et al. | |
| 2014/0127549 A1 | 5/2014 | Roh et al. | |
| 2014/0170450 A1 | 6/2014 | Takahashi et al. | |
| 2014/0248523 A1 | 9/2014 | Roh et al. | |
| 2015/0000991 A1* | 1/2015 | Lim | H01M 50/572 180/65.31 |
| 2015/0072176 A1 | 3/2015 | Dinkelman et al. | |
| 2016/0379790 A1* | 12/2016 | Boehme | H01H 79/00 335/12 |

FOREIGN PATENT DOCUMENTS

| | | |
|---|---|---|
| EP | 3540818 A1 | 9/2019 |
| EP | 3540822 A1 | 9/2019 |
| JP | 10-294097 A | 11/1998 |
| JP | 2001-524255 A | 11/2001 |
| JP | 2011-35049 A | 2/2011 |
| JP | 5106712 B2 | 12/2012 |
| JP | 5727090 B2 | 6/2015 |
| JP | 2015-122321 A | 7/2015 |
| KR | 10-2009-0043717 A | 5/2009 |
| KR | 10-1041153 B1 | 6/2011 |
| KR | 10-2013-0012354 A | 2/2013 |
| KR | 10-2013-0059301 A | 6/2013 |
| KR | 10-1281744 B1 | 7/2013 |
| KR | 10-2013-0086728 A | 8/2013 |
| KR | 10-1294168 B1 | 8/2013 |
| KR | 10-1389227 B1 | 4/2014 |
| KR | 10-2014-0053656 A | 5/2014 |
| KR | 10-2015-0007017 A | 1/2015 |
| KR | 10-1546545 B1 | 8/2015 |
| KR | 10-2016-0026469 A | 3/2016 |
| KR | 10-2016-0030688 A | 3/2016 |
| KR | 10-2017-0052989 A | 5/2017 |

OTHER PUBLICATIONS

European Office Action, dated Apr. 16, 2020, for European Application No. 18828081.2.
English-language Translation of KR 2014-0053656, published May 8, 2014.
English-language Translation of KR 2017-0052989, published May 15, 2017.

\* cited by examiner

BATTERY MODULE WITH SHORT-CIRCUIT UNIT, AND BATTERY PACK AND VEHICLE INCLUDING THE SAME

TECHNICAL FIELD

The present disclosure relates to a battery module, and a battery pack and a vehicle including the same, and more particularly, to a battery module having improved stability by preventing overcharge of the battery module, and a battery pack and a vehicle including the same.

The present application claims priority to Korean Patent Application No. 10-2017-0085993 filed on Jul. 6, 2017 in the Republic of Korea, the disclosures of which are incorporated herein by reference.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance secondary batteries allowing repeated charging and discharging are being actively studied.

Secondary batteries commercially available at the present include nickel-cadmium batteries, nickel hydrogen batteries, nickel-zinc batteries, lithium secondary batteries and the like. Among them, the lithium secondary batteries are in the limelight since they have almost no memory effect compared to nickel-based secondary batteries and also have very low self-discharging rate and high energy density.

The lithium secondary battery mainly uses lithium-based oxide and carbonaceous material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator being interposed therebetween, and an exterior, namely a battery case, in which the electrode assembly is accommodated and sealed together with an electrolyte.

Generally, a lithium secondary battery may be classified into a can-type secondary battery in which an electrode assembly is included in a metal can and a pouch-type secondary battery in which an electrode assembly is included in a pouch made of aluminum laminate sheets, depending on the shape of an exterior.

In recent years, secondary batteries have been widely used not only in small-sized devices such as portable electronic devices but also in medium-sized and large-sized devices such as vehicles and power storage devices. In particular, as carbon energy is getting depleted and the interest in the environment is increasing, the attention is focused on hybrid electric vehicles and electric vehicles around the world including the US, Europe, Japan and Korea. The most important component of the hybrid electric vehicles and electric vehicles is a battery pack that gives a drive power to a vehicle motor. Since the hybrid electric vehicle or electric vehicle is able to obtain a driving force of the vehicle through charging and discharging of the battery pack, the fuel efficiency is higher than that of a vehicle using only an engine, and pollutants may be reduced or substantially eliminated. For these reasons, the hybrid electric vehicles and electric vehicles are used more and more. In addition, the battery pack of the hybrid electric vehicle or electric vehicle includes a plurality of secondary batteries, and the plurality of secondary batteries are connected in series and in parallel to improve capacity and power.

The secondary battery has excellent electrical characteristics, but in the abnormal operating conditions such as overcharge, overdischarge, exposure to high temperature and electrical short circuit, the decomposition reaction of an active material, an electrolyte and the like of the battery is caused to generate heat and gas, thereby resulting in a so-called swelling phenomenon where the secondary battery swells. The swelling phenomenon accelerates the decomposition reaction, which may cause explosion and ignition of the secondary battery due to thermal runaway.

Thus, the secondary battery includes a safety system such as a protection circuit for cutting a current at overcharge, overdischarge or overcurrent, a positive temperature coefficient (PTC) element for cutting a current by greatly increasing resistance when temperature rises, a safety vent for cutting a current or venting a gas when pressure increases due to gas generation.

In particular, in the conventional art, in order to ensure the safety of the battery pack even if a swelling phenomenon occurs, an electrical connecting member that is cut off by a physical change when the volume of secondary batteries expands has been studied.

However, even if the electrical connecting member is used, it is difficult to surely cut the current of the secondary battery when the secondary batteries are expanded over a certain volume.

In addition, the secondary battery repeats expansion and contraction even when it is in a normal operating state, not in an abnormal operating state, and thus the current of the secondary battery may be cut even in a normal operation range, which may deteriorate the operation reliability.

DISCLOSURE

Technical Problem

The present disclosure is designed to solve the problems of the related art, and therefore the present disclosure is directed to providing a battery module which may prevent overcharge by electrically connecting a first bus bar and a second bus bar having different polarities by an expanding force applied due to a volume increase of battery cells when an overcharge situation occurs, thereby generating a short circuit so that a breaking portion formed in at least one of the pair of bus bars is broken to stop charging, and a battery pack and a vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a cell stack having a first battery cell and a second battery cell; a first bus bar connected to the cell stack and having a first polarity; a second bus bar connected to the cell stack and having a second polarity opposite to the first polarity; a short-circuit unit configured to move toward the first bus bar and the second bus bar by receiving an expanding force caused by a volume increase of the first battery cell and the second battery cell so that the first bus bar and the second bus bar are electrically connected to generate a short circuit; and a cartridge configured to at least partially accommodate each of the first bus bar, the second bus bar and the short-circuit unit.

The short-circuit unit may include an elastic member having one end supported to an inner side of the cartridge and configured to store an elastic energy by being compressed from an original state in a direction away from the bus bar; and a short-circuit terminal configured to move toward the bus bar when the elastic member is restored to the original state so that the first bus bar and the second bus bar are electrically connected.

The short-circuit terminal may be provided at one side end of a slide bar of the short circuit unit and is made of a conductive material.

A stopper may be provided at the other side end of the slide bar and be engaged by and fixed to the cartridge so that the elastic member keeps a compressed state and thus the slide bar keeps a state spaced apart from the first bus bar and the second bus bar.

The stopper may release the engagement with the cartridge by receiving the expanding force caused by swelling of the battery cell so that the slide bar moves toward the first bus bar and the second bus bar.

The cartridge may have an accommodation space formed therein with a shape corresponding to shape of the short-circuit unit to accommodate the short-circuit unit therein.

The accommodation space may be formed corresponding to size and shape of the short-circuit unit according to a restoration state of the elastic member.

A least one of the first bus bar and the second bus bar may have a breaking portion that breaks when the short circuit occurs to block the short-circuit current.

Meanwhile, in another aspect of the present disclosure, there is also provided a battery pack including the battery module, and there is also provided a vehicle including the battery module according to an embodiment of the present disclosure.

Advantageous Effects

According to the present disclosure, when an overcharge situation occurs, an expanding force is applied by a volume increase of battery cells so that a first bus bar and a second bus bar having different polarities are electrically connected to generate a short circuit and thus break a breaking portion formed in at least one of the pair of bus bars to stop charging, thereby preventing overcharge of a battery module. In this way, it is possible to improve safety of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, a battery module according to an embodiment of the present disclosure will be described with reference to FIGS. 1 to 3.

Figure 1:
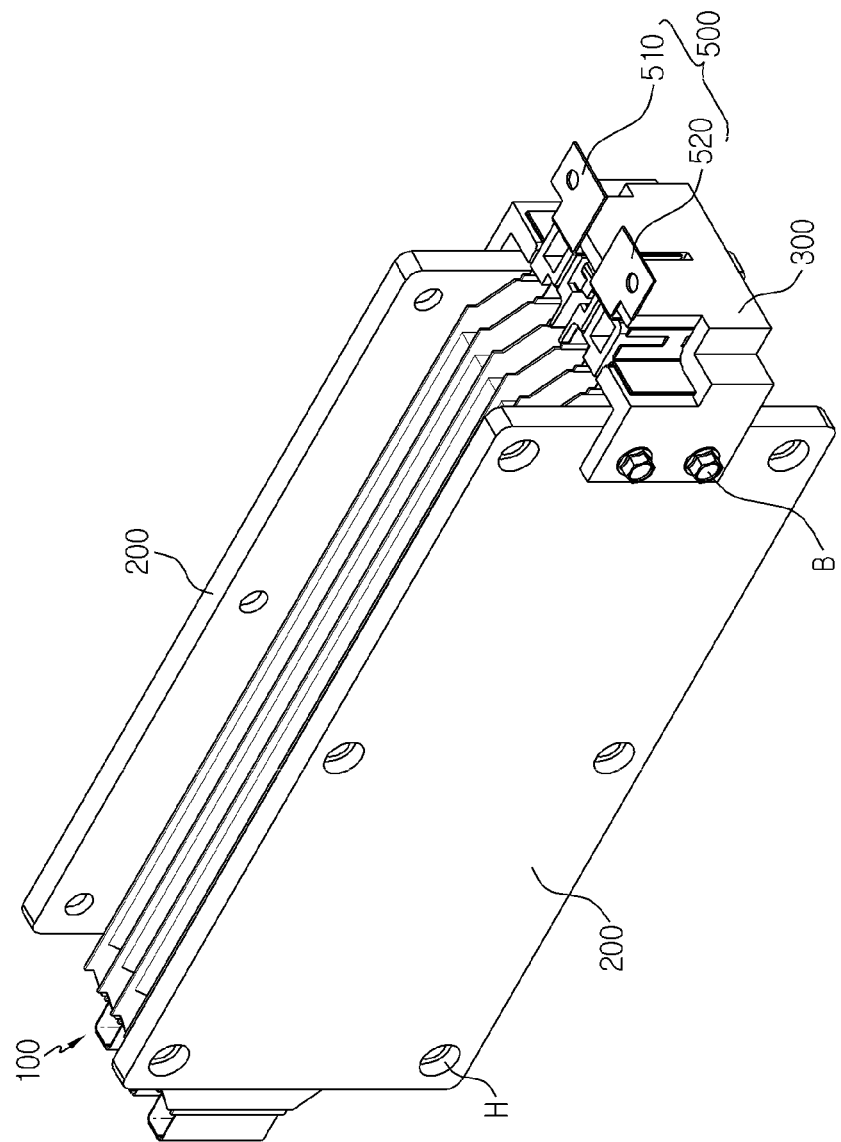
FIG. 1 is a perspective view showing a battery module according to an embodiment of the present disclosure.
Figure 2:
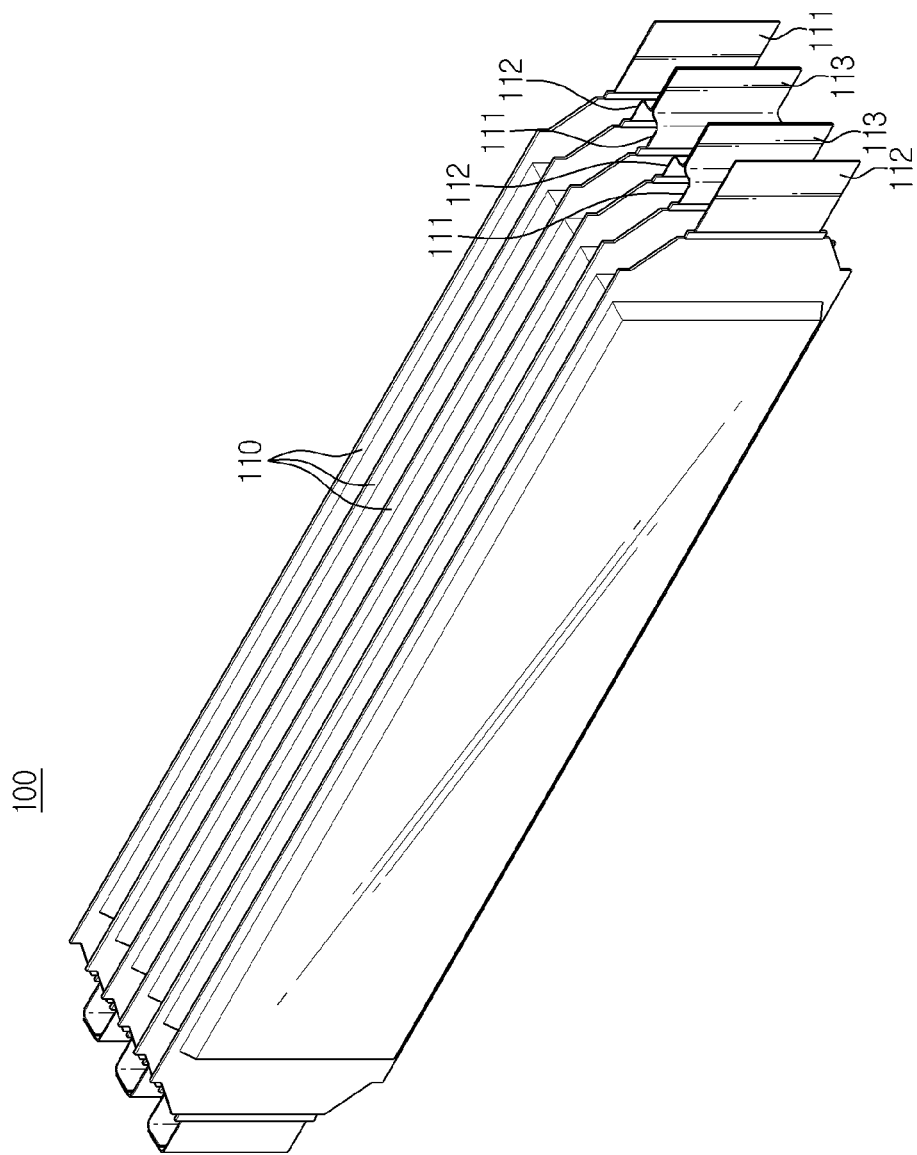
FIG. 2 is a perspective view showing a cell stack employed in the present disclosure.
Figure 3:
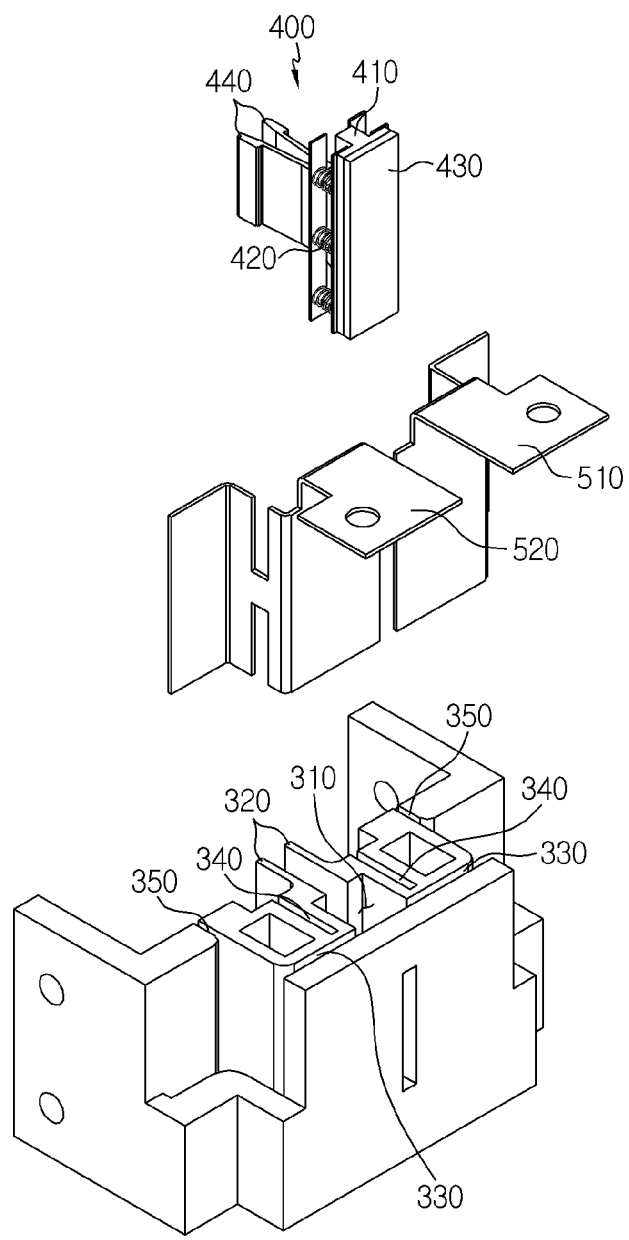
FIG. 3 is an exploded perspective view showing a cartridge and a short-circuit unit employed in the present disclosure.

FIG. 1 is a perspective view showing a battery module according to an embodiment of the present disclosure, FIG. 2 is a perspective view showing a cell stack employed in the present disclosure, and FIG. 3 is an exploded perspective view showing a cartridge and a short-circuit unit employed in the present disclosure.

Referring to FIGS. 1 to 3, the battery module according to an embodiment of the present disclosure may include a cell stack 100, a pair of end plates 200, a cartridge 300, a short-circuit unit 400 and a bus bar 500.

Referring to FIG. 2, the cell stack 100 includes at least two battery cells 110, and the plurality of battery cells 110 are stacked so that their broad surfaces face each other.

The battery cell 110 is a pouch-type cell and may be configured so that an electrode assembly prepared by laminating a positive electrode plate, a separator and a negative electrode plate at least once is accommodated in a pouch case made of a pouch film, and rim regions of upper and lower pouch cases are sealed by thermal fusing.

Here, a pair of electrode leads 111, 112 are respectively connected to uncoated portions of the positive electrode plate and the negative electrode plate of the electrode assembly and are drawn out through the sealing region of the pouch case.

The pair of electrode leads 111, 112 have different polarities, and the pair of electrode leads 111, 112 may extend in opposite directions. The battery cells 110 of the cell stack 100 may be arranged such that neighboring electrode leads have polarities opposite to each other. In this case, the battery cells 110 may be connected in series with each other.

If the battery cells 110 of the cell stack 100 are connected to each other in series as described above, a pair of battery cells 110 disposed at the outermost side of the cell stack 100 respectively include electrode leads 111, 112 extending in the same direction and having different polarities.

That is, the electrode lead 111 provided in the battery cell 110 disposed at one outermost side of the cell stack 100 and extending toward the cartridge 300 and the electrode lead 112 provided in the battery cell 110 disposed at the other outermost side of the cell stack 100 and extending toward the cartridge 300 have different polarities.

In addition, if a battery cell(s) 110 is further disposed between the pair of battery cells 110 disposed at the outermost side, in order to connect the battery cells 110 in series, the electrode leads 111, 112 having different polarities may be in contact to each other to form a single lead aggregate 113.

The electrode leads 111, 112 and the lead aggregate 113 are inserted and fixed in accommodation grooves formed in the cartridge 300 as described above, respectively, and this will be described in detail later.

Next, referring to FIG. 1, the pair of end plates 200 are disposed at both sides of the cell stack 100 to cover broad surfaces of the battery cells 110 disposed at the outermost sides. The pair of end plates 200 may be fastened to each other through a plurality of coupling holes H formed in peripheral regions thereof to fix and press the cell stack 100.

Though not shown in the figures, the pair of end plates 200 may be fastened through the coupling holes H by applying various known fastening structures such as a bolting assembly or a bolt and nut fastening structure.

In this way, even though swelling occurs at the battery cells 110, the movement of the cell stack 100 is restricted in a direction parallel to the stacking direction by applying the pair of end plates 200. Thus, even though swelling occurs at the battery cells 110, the volume of the battery cells 110 is hardly expanded along the stacking direction of the battery cells 110, and the battery cells 110 are mainly expanded along a direction perpendicular to the stacking direction.

Next, referring to FIG. 3, where the cartridge 300 is positioned at one side of the cell stack 100, in a direction along which the electrode leads 111, 112 and the lead aggregate 113 provided at the cell stack 100 are extended, so that one side of the cartridge 300 is fixed to one end plate 200 and the other side thereof is fixed to the other end plate 200. The cartridge 300 and the end plates 200 may be fixed using a bolt B.

The cartridge 300 has an accommodation space 310 with a shape corresponding to the short-circuit unit 400, explained later, and also has a support portion 320 formed so that a stopper 440 of the short-circuit unit 400 may be caught and fixed. In addition, the cartridge 300 includes a first accommodation groove 330, a second accommodation groove 340 and a third accommodation groove 350 in which bus bars 510, 520, the lead aggregate 113 and the electrode leads 111, 112 are inserted and fixed, respectively.

Next, the short-circuit unit 400 employed at the present disclosure will be described in detail with reference to FIGS. 4 and 5 along with FIG. 3.

Figure 4:
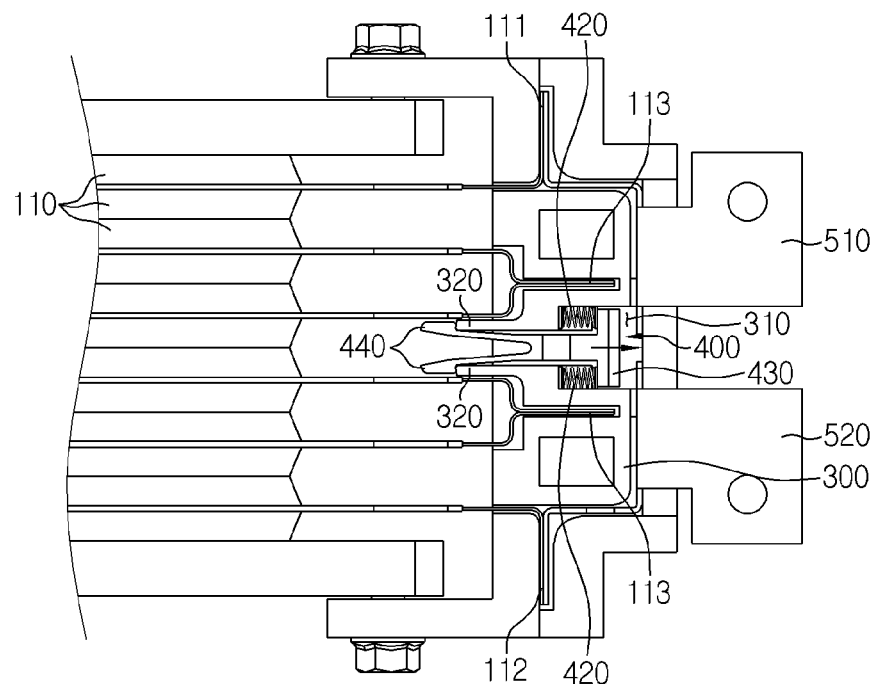
FIG. 4 is a partial plane view showing the battery module according to an embodiment of the present disclosure, to illustrate a state before swelling occurs.
Figure 5:
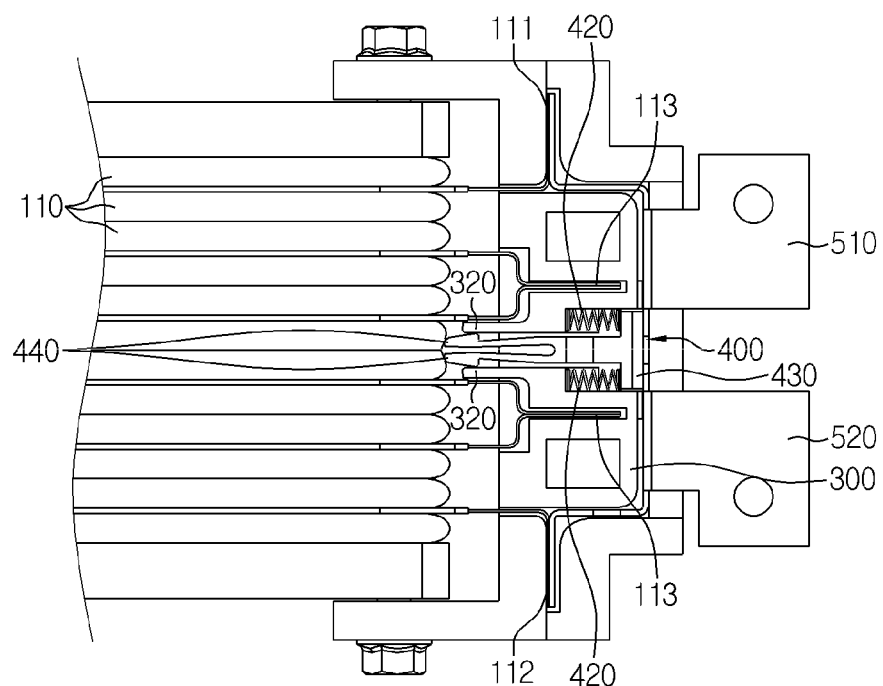
FIG. 5 is a partial plane view showing the battery module according to an embodiment of the present disclosure, to illustrate a state after swelling occurs.

FIG. 4 is a partial plane view showing the battery module according to an embodiment of the present disclosure, to illustrate a state before swelling occurs, and FIG. 5 is a partial plane view showing the battery module according to an embodiment of the present disclosure, to illustrate a state after swelling occurs.

Referring to FIGS. 3 to 5, the short-circuit unit 400 is a component for electrically connecting the first bus bar 510 and the second bus bar 520 by using the expanding force of the battery cells 110 caused by swelling, so that a short circuit is generated.

The short-circuit unit 400 may include a slide bar 410, an elastic member 420, a short-circuit terminal 430, and a pair of stoppers 440.

The slide bar 410 is disposed in the accommodation space 310 of the cartridge 300 and moves from the battery cell 110 toward the bus bars 510, 520 when an expanding force is applied to the short-circuit unit 400 due to swelling.

The slide bar 410 may be moved toward the bus bars 510, 520 by the force generated when the elastic member 420 such as a spring is compressed and then restored. In order to electrically connect the pair of bus bars 510, 520 when the slide bar 410 is moved, the slide short-circuit unit 400 includes a short-circuit terminal 430 formed at one side end of the slide bar 410 and made of a conductive material.

In addition, the short-circuit unit 400 includes the stopper 440 formed at one side end of the slide bar 410 so that the elastic member 420 may maintain a compressed state. The stopper 440 has, for example, a hook shape and may be caught by the support portion 320 of the cartridge 300.

As described above, in the short-circuit unit 400, in a situation where swelling is not generated, the stopper 440 keeps caught by the support portion 320, and thus the elastic member 420 stores the elastic energy in a compressed state.

Meanwhile, in the short-circuit unit 400, if swelling occurs in the battery cells 110 to apply an expanding force of the battery cell 110 to the stopper 440, the caught and fixed state between the stopper 440 and the support portion 320 is released, and the slide bar 410 is moved toward the bus bars 510, 520 due to the restoration force of the elastic member 420 to electrically connect the pair of bus bars 510, 520 having different polarities to each other, thereby generating a short circuit.

Next, the configuration of the bus bar 500 employed at the present disclosure will be described in detail with reference to FIG. 6 along with FIGS. 3 to 5.

Figure 6:
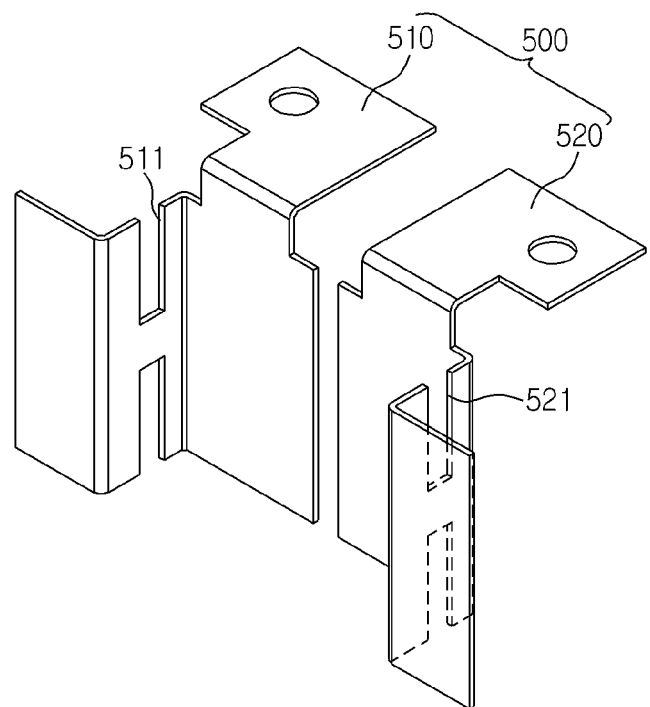
FIG. 6 is a perspective view showing a bus bar employed at the battery module according to an embodiment of the present disclosure.

FIG. 6 is a perspective view showing a bus bar employed at the battery module according to an embodiment of the present disclosure.

Referring to FIG. 6, the bus bars 510, 520 employed at the present disclosure are accommodated and fixed in the first accommodation groove 330 formed in the cartridge 300, and their one ends are in contact with the electrode leads 111, 112 of the battery cells 110 disposed at the outermost sides of the cell stack 100 inside the third accommodation groove 350 of the cartridge 300.

That is, the pair of bus bars 510, 520 may be electrically connected to the cell stack 100 to have a first polarity and a second polarity opposite to the first polarity, respectively, and function as an external terminal of the battery module. Accordingly, the pair of bus bars 510, 520 may be respectively connected to a positive electrode and a negative electrode of an external device such as charging device or an electronic device driven by an electric energy to supply or receive a charging current.

Meanwhile, at least one of the pair of bus bars 510, 520 according to the present disclosure may include breaking portions 511, 521 to break quickly and thus entirely block the current flow when overcurrent is generated due to a short circuit.

As shown in FIG. 6, the breaking portions 511, 521 may be shaped to have a smaller cross-sectional area becomes as compared with the peripheral regions by forming a notch thereto. However, the breaking portions 511, 521 may be prepared without any limitation as long as they may function as a fuse, for example by applying a metal with a lower melting point than the peripheral regions, in addition to the notch.

Next, the circuit configurations before and after a swelling phenomenon occurs due to overcharge or the like at the battery module according to an embodiment of the present disclosure will be described with reference to FIGS. 7 to 9.

Figure 7:
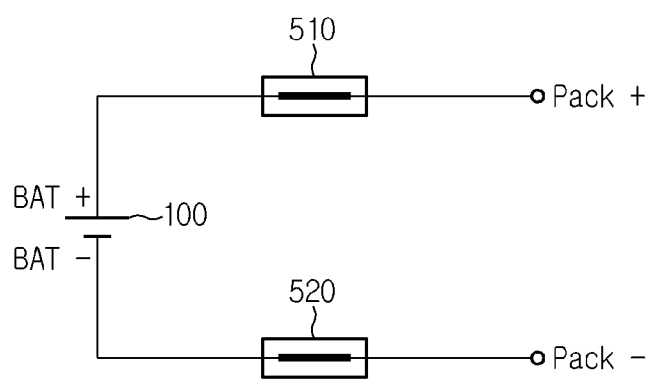
FIG. 7 is a circuit diagram showing a state before a short circuit occurs at the battery module according to an embodiment of the present disclosure.
Figure 8:
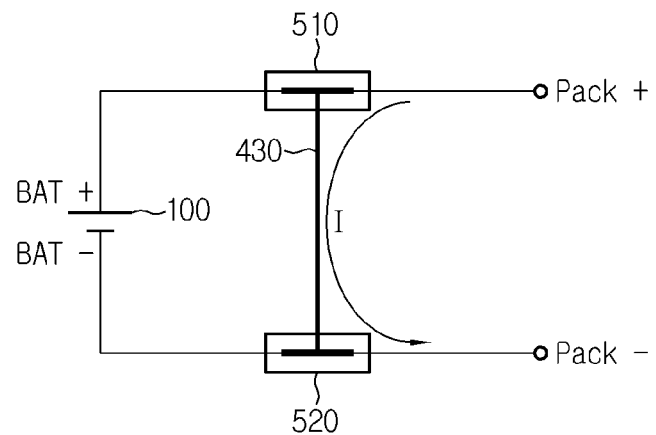
FIG. 8 is a circuit diagram showing a state after a short circuit occurs at the battery module according to an embodiment of the present disclosure.
Figure 9:
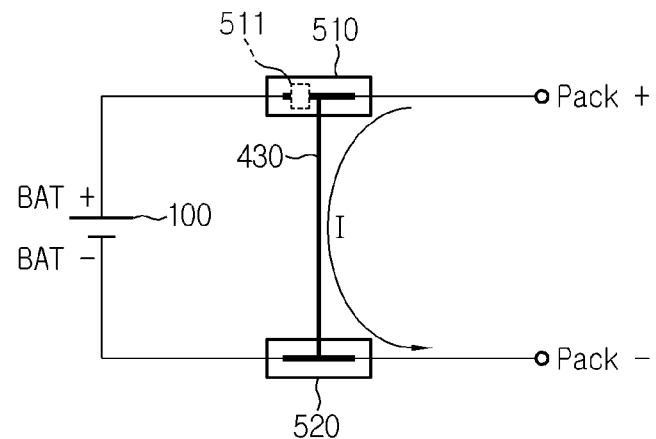
FIG. 9 is a circuit diagram showing a state where the bus bar is broken due to a short circuit generated at the battery module according to an embodiment of the present disclosure.

FIG. 7 is a circuit diagram showing a state before a short circuit occurs at the battery module according to an embodiment of the present disclosure, FIG. 8 is a circuit diagram showing a state after a short circuit occurs at the battery module according to an embodiment of the present disclosure, and FIG. 9 is a circuit diagram showing a state where the bus bar is broken due to a short circuit generated at the battery module according to an embodiment of the present disclosure.

First, referring to FIG. 7, if swelling due to overcharge or the like does not occur at the battery module according to the present disclosure, the volume of the battery cell 110 does not increase, and thus a short circuit is not generated on the circuit.

However, as shown in FIG. 8, if swelling due to overcharge occurs at the battery module according to the present disclosure, the short-circuit unit 400 may receive an expanding force of the battery cell 110 to electrically connect the first bus bar 510 and the second bus bar 520 so that a short circuit is generated on the circuit, and thus an abnormal high current may flow on the circuit.

After that, the breaking portion 511, 521 formed in at least one of the bus bars is broken due to heat generation caused by the high current, thereby blocking a current flow supplied from an external voltage source to the battery module or a current flow supplied from the battery module to an external electronic device. In this way, it is possible to prevent the battery module from being exploded or ignited in advance.

Meanwhile, a battery pack according to the present disclosure includes at least one battery module as described above. Also, in addition to the battery module according to an embodiment of the present disclosure, the battery pack may further include a case for accommodating the battery module, and various devices for controlling charge/discharge of the battery module such as a battery management system (BMS), a current sensor and a fuse.

In particular, the battery pack according to an embodiment of the present disclosure may include the first bus bar, the second bus bar, the short-circuit unit and the cartridge at each battery module provided at the battery pack to cut off the power supplied from the external voltage source by fracturing the first bus bar when the battery cell abnormally expands, so that overcharge is prevented for each battery module.

The battery module according to the present disclosure may be applied to a vehicle such as an electric vehicle and a hybrid vehicle. That is, the vehicle according to the present disclosure may include the battery module of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a cell stack having a first battery cell and a second battery cell;
a first bus bar connected to the cell stack and having a first polarity;
a second bus bar connected to the cell stack and having a second polarity opposite to the first polarity;
a short-circuit unit configured to move toward the first bus bar and the second bus bar by receiving an expanding force caused by a volume increase of the first battery cell and the second battery cell so that the first bus bar and the second bus bar are electrically connected to generate a short circuit; and
a cartridge configured to at least partially accommodate each of the first bus bar, the second bus bar and the short-circuit unit,
wherein the short-circuit unit includes:
an elastic member having one end supported to an inner side of the cartridge and configured to store an elastic energy by being compressed from an original state in a direction away from the bus bar;
a slide bar;
a short-circuit terminal at a first end of the slide bar configured to move toward the bus bar when the elastic member is restored to the original state so that the first bus bar and the second bus bar are electrically connected; and
a stopper provided at a second end of the slide bar and engaged by and fixed to the cartridge so that the elastic member keeps a compressed state and thus the slide bar keeps a state spaced apart from the first bus bar and the second bus bar,
wherein the stopper releases the engagement with the cartridge by receiving the expanding force caused by swelling of the battery cell so that the slide bar moves toward the first bus bar and the second bus bar.

2. The battery module according to claim 1, wherein the slide bar of the short circuit unit is made of a conductive material.

3. The battery module according to claim 1, wherein the cartridge has an accommodation space formed therein with a shape corresponding to a shape of the short-circuit unit to accommodate the short-circuit unit therein.

4. The battery module according to claim 3,
wherein the accommodation space is formed corresponding to size and shape of the short-circuit unit according to a restoration state of the elastic member.

5. The battery module according to claim 1,
wherein at least one of the first bus bar and the second bus bar has a breaking portion that breaks when the short circuit occurs to block the short-circuit current.

6. A battery pack, comprising a battery module defined in claim 1.

7. A vehicle, comprising a battery module defined in claim 1.

* * * * *